May 29, 1962 J. D. KIRCHHOFER 3,036,690
MATERIAL HANDLING APPARATUS
Filed Sept. 15, 1958
7 Sheets-Sheet 1

INVENTOR.
JOSEPH D. KIRCHHOFER
BY
Learman, Learman + McCulloch
ATTORNEYS

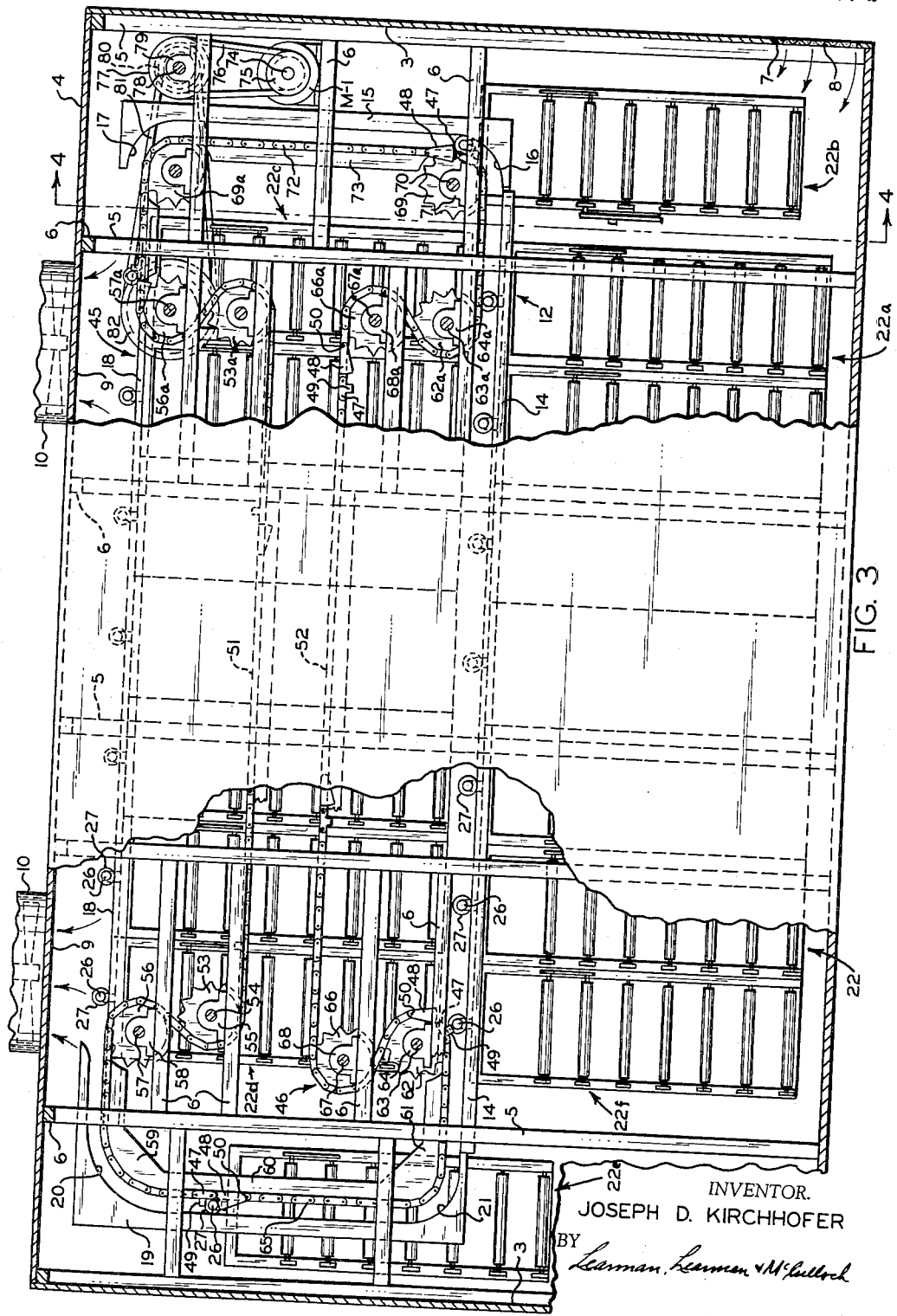

May 29, 1962

J. D. KIRCHHOFER 3,036,690

MATERIAL HANDLING APPARATUS

Filed Sept. 15, 1958

INVENTOR.
JOSEPH D. KIRCHHOFER
BY
Learman, Learman & McCulloch
ATTORNEYS

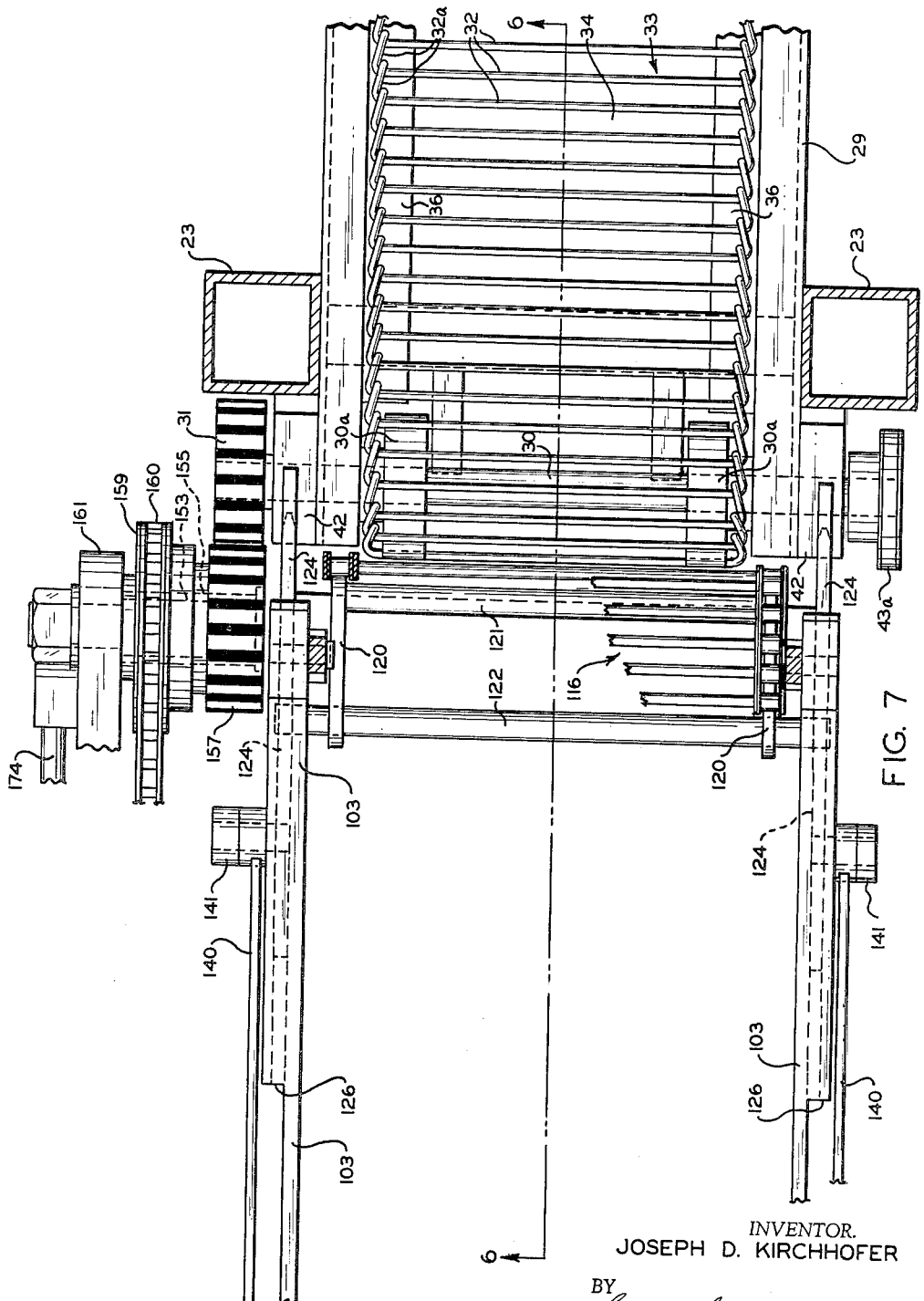

United States Patent Office 3,036,690
Patented May 29, 1962

3,036,690
MATERIAL HANDLING APPARATUS
Joseph D. Kirchhofer, Saginaw, Mich., assignor to Baker Perkins Inc., Saginaw, Mich., a corporation of New York
Filed Sept. 15, 1958, Ser. No. 761,130
27 Claims. (Cl. 198—20)

This invention relates to apparatus for handling materials such as farinaceous food products and more particularly the invention pertains to apparatus especially adapted for use in commercial bakeries for cooling large quantities of a variety of baked products under rigidly controlled conditions.

The cooling of freshly baked food products such as bread loaves emerging from ovens must be accomplished gradually in order to avoid undesirable side effects such as checking or splitting of the crust. One of the prime objects of the invention, therefore, is to provide apparatus adapted to be associated intimately with commercial bake ovens for receiving food products discharged therefrom and conducting them through a cooling cycle wherein the temperature and other factors affecting cooling of the products may be controlled.

Apparatus of the kind under consideration is adaptable to automated bakeries wherein all operations connected with the baking process are performed by machinery. In such circumstances, a machine forming part of a line of machinery must have a capacity and be capable of operating at such speed as to conform to the capacity and speed of other machines in the line. Accordingly, another principal object of the invention is to provide material handling apparatus which is adapted for use in conjunction with existing bakery machinery and which is capable of operating at such speed as to accommodate the flow of products presented to it.

Many bakeries produce a variety of products such as bread, rolls, cookies, crackers, and the like, and not all such products may be handled in the same manner. For example, loaves of bread are baked in pans of substantial height whereas rolls and cookies are baked in pans and trays of considerably less height. Moreover, other kinds of products are not baked in pans at all. Bakery machines of the general class to which the invention pertains have been equipped heretofore with means for pushing pan sets containing the food products into and out of the machines, but such pushing means are not readily capable of handling the multiple kinds of equipment utilized by bakeries producing more than one kind of product, nor are they capable of handling products which are not in pans. For example, a machine equipped with means for moving bread loaf pan sets into and out of a machine may not be capable of handling the pans and trays of the kind in which rolls and cookies are baked, nor would it be suitable for use in those instances where the bake goods are not carried by pans or trays. An important object of the invention, therefore, is the provision of loading and unloading mechanism capable of handling with equal facility all kinds of baking utensils as well as baked products not carried by pans or trays.

Apparatus constructed in accordance with the invention is adapted to receive baked products and conduct them through a cooling or analogous cycle to a point of discharge. Many of the known bakery machines include conveyors for moving the bake products in cycles and such machines usually require the provision of multiple conveyors and a corresponding number of driving motors, thereby necessitating the provision of fairly complex and expensive synchronizing mechanisms to assure the driving of all conveyors at the same speed. Another object of the invention, therefore, is the provision of unitary conveying apparatus for conducting the bake products through a complete cycle, thereby eliminating the need for multiple driving units and synchronizing mechanisms.

Automatically loading and unloading machines of the kind referred to perforce operate intermittently in order that bake products may be loaded and unloaded in an orderly manner without risking injury to the products. With such machines a problem has existed heretofore in locating the product carriers or racks in proper positions to assure smooth transfer of the products to and from the machines. A further object of this invention, accordingly, is the provision of improved apparatus for locating the product carriers in such positions as to assure smooth delivery of the products to and from the machine.

Other objects and advantages of the invention will be pointed out specifically or will become apparent from the following description when it is considered in conjunction with the appended claims and the accompanying drawings, in which:

FIGURE 3 is an enlarged, fragmentary, side elevational view of the apparatus with parts of the housing broken away to disclose the arrangement of mechanisms located within the housing;

FIGURE 7 is a sectional view taken on the line 7—7 of FIGURE 6;

The Housing Structure

Figure 2:
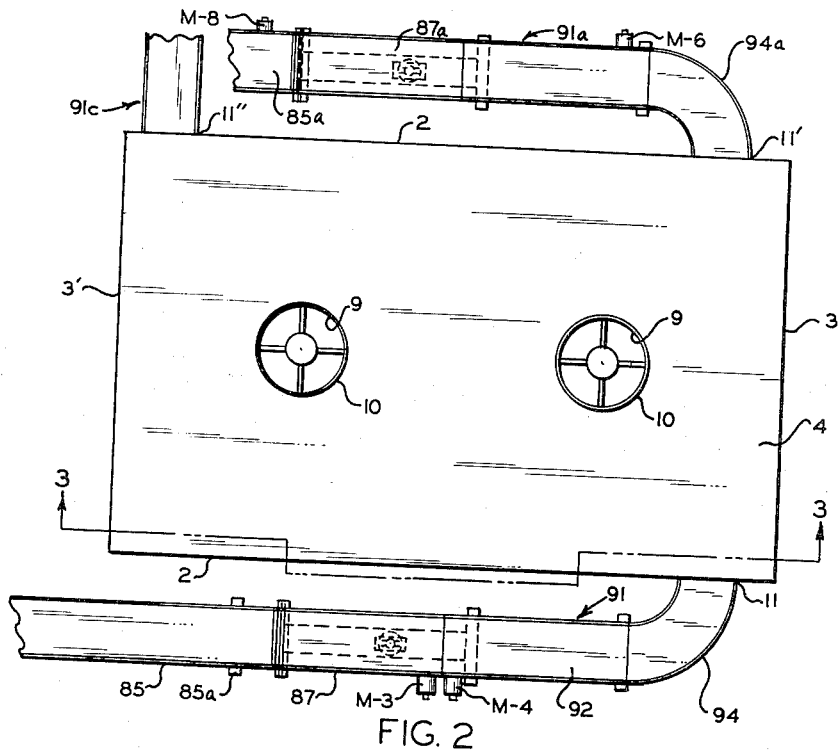
FIGURE 2 is a top plan view of the apparatus shown in FIGURE 1.

Apparatus constructed in accordance with the invention includes a housing structure indicated generally by the reference character 1 and including side walls 2, 2′, end walls 3, 3′, and top and bottom walls 4, 4′, respectively, interconnected with one another by suitable means and to form a cabinet supported by a skeleton framework including vertical and horizontal members 5 and 6, respectively (see FIGURE 3). The side and end walls of the housing structure may be provided with a suitable number of openings 7, preferably adjacent to the lower ends of the respective walls, through which air may be drawn and, preferably, filters 8 are placed in the openings 7 to prevent the entry of dust into the housing. The top wall 4 of the cabinet may be provided with one or more openings 9 of such size as to accommodate a corresponding number of fan structures 10 by means of which air may be circulated through the housing in the direction of the arrows in FIGURE 3.

Adjacent to one end of the housing structure 1 each of the side walls 2, 2′ is provided with an opening 11, 11′ about which more will be said subsequently. The side wall 2′ preferably is provided with another opening 11″ similar to the opening 11′, but located near the opposite end of the cabinet.

Within the housing and secured either to the side walls of the latter or to selected frame members 5 and 6 by suitable means, such as welding or the like, is a plurality of guide members forming a closed loop 12. Referring to FIGURE 3, the loop comprises a pair of spaced, parallel track sections 14 forming a lower reach or run of the loop 12 and communicating at one of its ends with a guide composed of a pair of similar, spaced, parallel members 15 arranged to form a vertical reach or run of the loop and having arcuate portions 16 and 17 at its ends. Adjacent to the upper ends 17 of the members 15 is mounted a pair of parallel, spaced members 18 forming an upper horizontal run of the loop which parallels the lower run 14 of the latter. Corresponding ends of the upper and lower runs of the loop communicate with a pair of track members 19 which are spaced from one another and arranged to form a second vertical run of the loop. Again, the members 19 have arcuate upper and lower ends 20 and 21, respectively.

The Material Carriers

Mounted on the closed loop 12 within the housing structure 1 is a plurality of material carriers or racks 22. Each rack is identical, so only one need be described specifically. The racks 22 are best disclosed in FIGURES 3 and 4 wherein each rack is disclosed as comprising four main, vertically arranged frame members 23, the members 23 at each end of the rack being bridged by a horizontal frame member 24. On each of the horizontal members 24 is mounted a journal block 25 in which is rotatably journaled a shaft 26 having a flanged wheel 27 keyed thereto adjacent to each of its ends.

Spanning the distance between the end pairs of frame bars 23, and projecting slightly beyond the latter, is a plurality of horizontal frame elements 29 which may be welded or otherwise suitably secured to the frame bars 23. In the illustrative embodiment of the invention, there are seven frame bars 29, each of which is spaced vertically, uniformly, from one another, but more or less frame bars may be employed if desired. At each end of each frame bar 29 is rotatably journaled a shaft 30 (see FIGURE 6) and adjacent to each end of each shaft 30 is keyed or otherwise suitably fixed a toothed wheel 30a. Fixed at one extremity of one shaft of each set of frame bars 29 is a gear 31 the purpose of which will be explained later. Trained around the wheels 30a of each set of cross elements 29 is an endless material supporting conveyor 33 composed of a plurality of rods 32 having their ends bent to form links 32a (see FIGURE 7) so that all of the rods 32 are interconnected and are spaced from one another a distance corresponding to the spacing of the teeth in the toothed wheels 30a. The arrangement is such that the conveyor 33 has an upper run 34 and a lower run 35, the upper run serving as a material supporting surface on which baked goods or the like may be carried. Preferably, each of the frame elements 29 includes upper and lower guides 36 and 37, respectively, located adjacent to the side edges of the conveyor to maintain the upper run of the latter substantially horizontal and to prevent sagging of the lower run. In order to guide the lower run of the chain from and to the toothed wheels 30a, a guide tongue 38 (see FIGURE 6) may be mounted on a support 39 spanning adjacent frame elements 23 and arranged to project towards the associated toothed wheels 30a.

Figure 5:
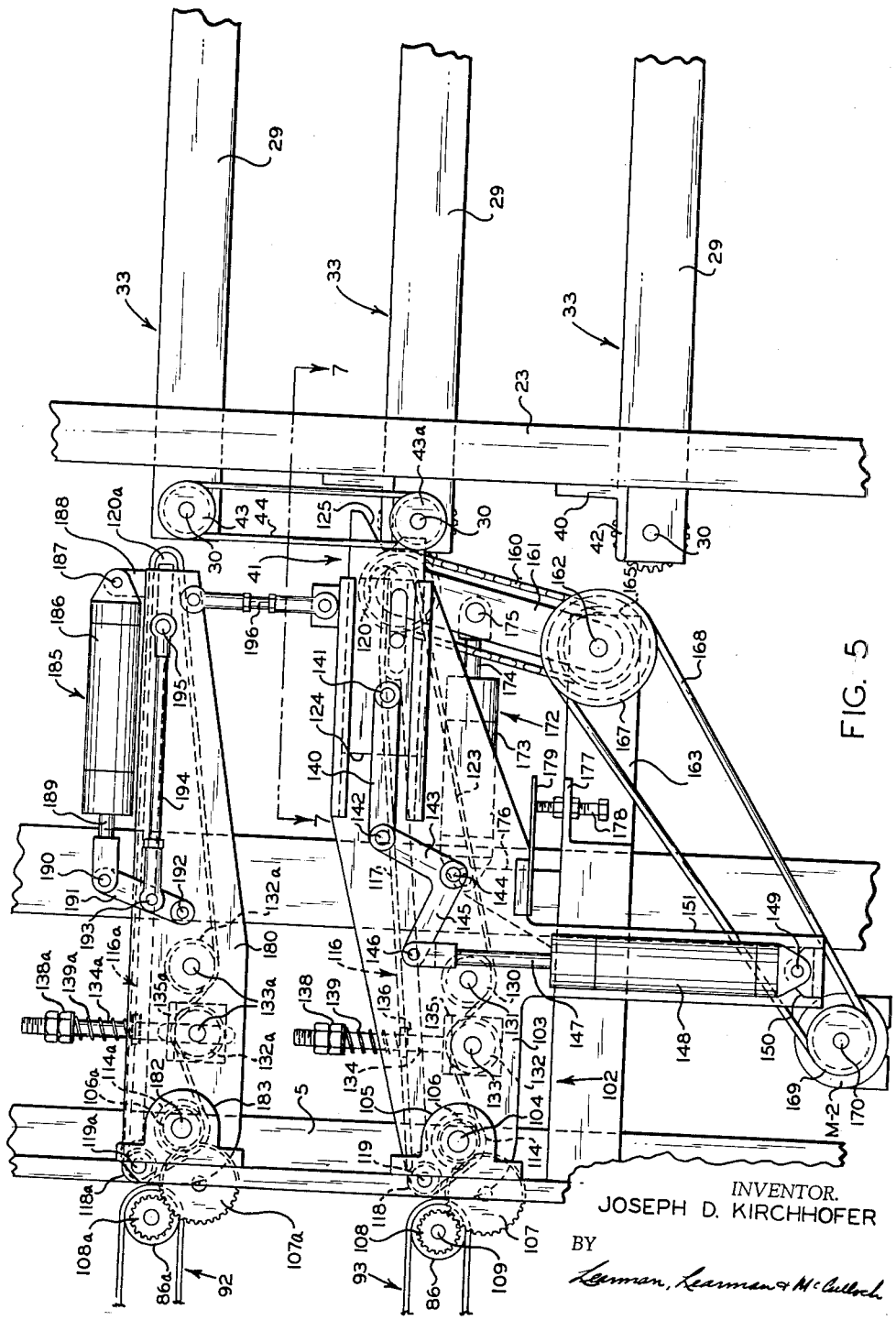
FIGURE 5 is a fragmentary, enlarged, elevational view of a portion of the apparatus shown in FIGURE 4.
Figure 6:
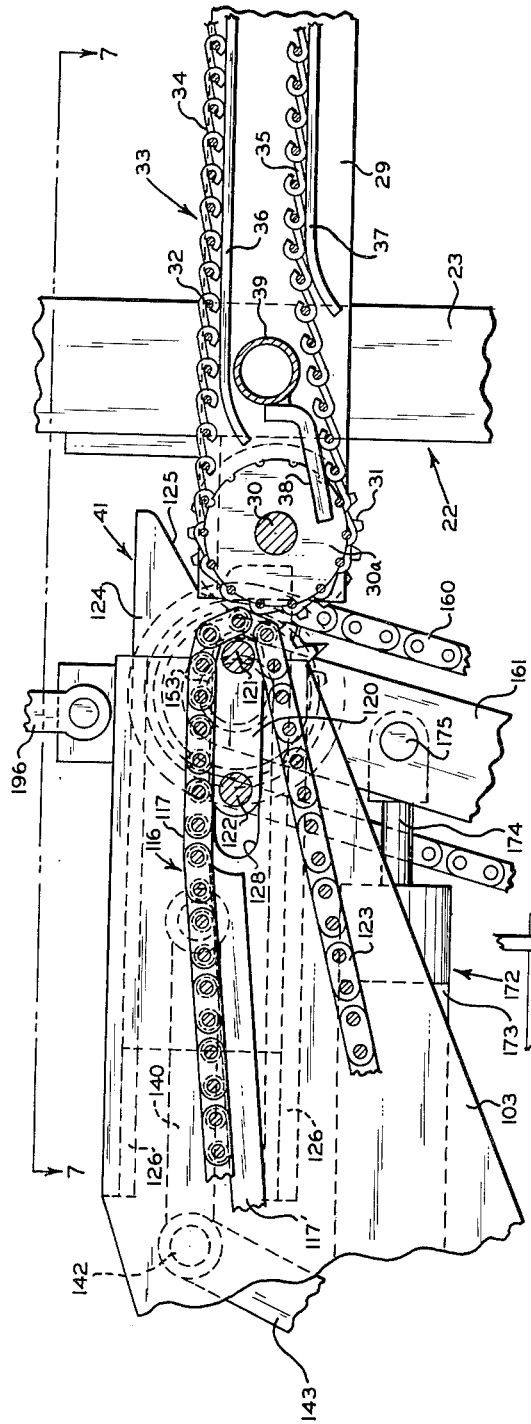
FIGURE 6 is a fragmentary, partly sectional, enlarged view of a portion of the apparatus shown in FIGURE 5.

As is best shown in FIGURES 5 and 6, each of the material supporting conveyors, except the uppermost conveyor, is provided with a member such as an angle iron 40 forming a part of positioning means 41 yet to be described. Each of the angle irons 40 may be welded or otherwise suitably secured to two of the frame members 23 and so arranged that one of the flanges 42 of the angle iron projects beyond the associated frame elements 23 for a purpose presently to be explained.

Referring again to FIGURES 4 and 5, the shaft 30 at one end of the uppermost conveyor 33 of each rack is provided with a pulley or sprocket wheel 43 around which a belt or chain 44 is trained. The shaft 30 of the adjacent or second conveyor is provided with a similar pulley or sprocket wheel 43a around which the belt or chain 44 also is trained so that the conveyors of both the upper and second tiers or shelves may be driven simultaneously. The diameters of the pulleys 43 and 43a are the same so that both conveyors are driven at the same speed.

Rack Conveying Mechanism

The rack conveying mechanism is best disclosed in FIGURE 3 and is designated generally by the reference character 45. The conveying mechanism 45 is an important characteristic of the invention, as will be pointed out more particularly hereinafter, and utilizes a single set or pair of conveyor chains 46 driven from a single motor M–1. By "set of chains" is meant one chain at one side of the housing and another identical chain at the other side of the housing. Each chain of the set of chains 46 preferably is of the sprocket link type having a plurality of special links 47 and 48 arranged at spaced intervals along the length of the chains. Each link 47 includes a projecting portion 49, whereas each link 48 comprises a generally segment-shaped element pivoted as at 50 to an adjacent chain link so as to be swingable through an arc. The function of the links 47 and 48 will be described hereinafter.

Each set of conveyor chains includes an upper, generally horizontal flight 51 and a substantially parallel lower flight 52. At one end of the upper flight 51, the chain is trained around a sprocket 53 mounted on a shaft 54 which is journaled in a block 55 supported on a frame member 6. From the sprocket 53, the chain is trained around another sprocket 56 mounted on a shaft 57 journaled in a block 58 which is supported on a frame member 6 at a higher level than the block 55. From the sprocket 56, the chain extends substantially horizontally for a short distance and is supported by an arcuate guide member 59 which merges with a vertical guide member 60 and which is spaced from the guide 19 so as to accommodate the chain therebetween. The lower end of the vertical guide member 60 merges with an arcuate guide member 61 around which the chain passes to a sprocket 62 mounted on a shaft 63 which is supported in a block 64 mounted on a frame member 6. The location of the sprocket 62 is such that the chain has a short, generally horizontal portion at the end of its vertical flight 65.

From the sprocket 62, the chain is trained around a similar sprocket 66 which is similarly mounted on a shaft 67 journaled in a block 68 mounted on a frame member 6 at a level higher than the block 64. From the sprocket 66, the lower flight 52 of the chain extends to the opposite end of the housing structure and passes around sprockets similar to and mounted according to the sprockets 66 and 62. The sprockets at the opposite end of the housing structure and their supporting parts bear reference characters the same as the corresponding elements at the other end of the housing, but include the suffix a. From the lower sprocket 62a, the chain has a short, generally horizontal run and then passes around a sprocket 69 mounted on a shaft 70 journaled in a block 71 mounted on a frame bar 6. From the sprocket 69 the chain extends vertically to provide a vertical flight 72 parallel to the guide 15 passing between the latter and a straight guide member 73. At the upper end of the vertical run 72, the chain passes around a sprocket 69a similar in all respects to the sprocket 69 and similarly mounted so as to form a short, horizontal run between the sprocket 69 and a sprocket 56a similar to the sprocket 56 previously described. The chain passes around the sprocket 56a and also around a sprocket 53a which is similar to the sprocket 53.

Means for driving the conveyor mechanism 45 includes the motor M–1 having an armature shaft 74 on which is mounted a driving pulley 75. Around the pulley 75 is trained one or more belts 76 which are also trained around a pulley 77 mounted on a shaft 78 journaled in blocks 79 supported on the housing frame. The shaft 78 may span the width of the housing 1 so as to drive both chains of the set of chains by similar mechanisms, only one of which is shown.

Mounted on the shaft 78 is a pulley 80 for each chain of the set 46 around which is trained a belt 81 that drives a pulley 82 mounted on the shaft 57a. The arrangement is such that operation of the motor causes rotation of the shafts 57a and, consequently, driving movement of the conveyor chains 46. The direction of drive of the motor M-1 should be so selected that the vertical run 65 of the conveyor mechanism moves vertically downwardly, and the vertical run 72 at the opposite end of the housing structure moves vertically upwardly.

The conveying mechanism of the invention is completed by the horizontal track members 14 and 18 which were described in connection with the housing structure. The purpose of the track forming members 14 and 18 is to support the flanged wheels 27 at the upper end of each of the rack members 22 during their passage along the upper and lower runs of the closed loop.

When the apparatus described thus far has been conditioned for operation, a full complement of racks will be located within the housing structure. By a full complement of racks is meant enough racks to span the upper and lower runs of the closed loop with one rack on each of the vertical runs of the loop. With this number of racks, actuation of the conveying mechanism will cause one of the projections 49 of a link 47 to engage the shaft 26 of the rack occupying the position of the rack 22a, that is, the rack at the right hand end of the lower tracks 14 in FIGURE 3, and move the rack 22a to the position of the rack 22b; that is, at the beginning of the vertical elevator run 72. Continued operation of the driving mechanism will cause the rack 22b to be elevated from the lower run of the loop to the upper run of the latter and be moved from right to left, as is viewed in FIGURE 3, inasmuch as there is a short, horizontal run at the upper end of the vertical flight 72. As the rack 22b begins to traverse a horizontal path, it will engage the rack 22c at the right hand end of the upper run of the loop and will push all of the racks on the upper run along the tracks 18 from right to left. As the rack 22d at the left hand end of the upper run is pushed from right to left, the projection 49 of a link 47 will engage the shaft 26 at the upper end of that rack and will cause it to be propelled towards the vertical flight 65. As the wheels 27 of the rack 22d enter the passage between the guide members 20 and 59, the latter guide member will bear against the arcuate link 48 and pivot the latter into such position that it functions as a latch and supports the rack 22d as it moves into the position of the rack 22e. Continued operation of the conveying mechanism will cause the rack 22e to traverse the vertical flight 65 and move onto the lower run of the loop. Because of the short, horizontal run at the end of the vertical flight 65, the projection 49 on the associated link 47 will push the rack 22e against the rack 22f at the left hand end of the lower run and, consequently, will push all of the racks on the lower run from left to right in order that the cycle may be repeated.

From the foregoing description of the operation of the conveying mechanism, it will be clear that a continuous and orderly progression of each of the racks through the closed loop is achieved by the provision of a single set of conveyor chains driven from a single motor. As a result, the provision of multiple sets of conveyors and multiple motors and complicated and expensive synchronizing mechanisms are dispensed with.

Article Delivery Mechanism

Figure 1:
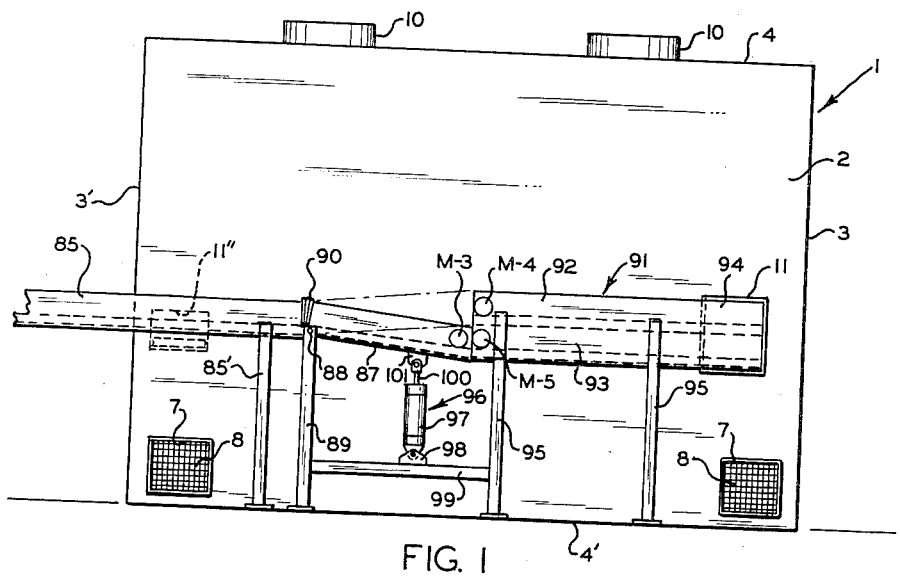
FIGURE 1 is a side elevational view of apparatus formed in accordance with the invention.

The material delivery mechanism is best illustrated in FIGURES 1 and 2 and comprises a covered conveyor 85 leading from an oven or other machine (not shown) to the housing structure 1. Within the conveyor 85 and at the bottom thereof may be provided a continuous belt, powered rollers or the like driven by a motor M-3 and by means of which baked goods or other articles may be conveyed along the conveyor. The conveyor 85 is supported at a level corresponding substantially to the level of the opening 11 in the housing 1 by means of standards 85' placed at suitable intervals along the length of the conveyor. The conveyor 85 terminates short of the opening 11 in the housing and is provided at its end with an extension or boom 87 similar in all respects to the conveyor 85, and driven by the same motor, and pivoted to the conveyor 85 as at 88 for rocking movement about a horizontal axis. The pivoted end of the boom 87 may be supported on a standard 89 and a flexible boot 90 may be associated with the conveyor 85 and the boom 87 to cover the joint therebetween.

Adjacent to the other end of the extension 87 is a conveyor assembly 91 comprising an upper conveyor 92 driven by a motor M-4 and a lower conveyor 93 driven by a motor M-5. Both of the conveyors 92 and 93 are covered and each is of a size corresponding generally to the size of the conveyors 85 and 87. The conveyor assembly 91 may include an arcuate portion 94 which joins the sections 92 and 93 to the housing structure 1 at the opening 11. The ends of the conveyors 92 and 93 adjacent to the housing 1 terminate in rolls 86a and 86, respectively (see FIGURE 5). The assembly 91 is supported by suitable standards 95 similar to the standards 85'.

The construction and arrangement of the article delivering apparatus is such that the boom 87 is capable of adjustment so as to feed material from the chute 85 to either of the conveyors 92 or 93. Means for selecting to which of the conveyors 92 or 93 the material emerging from the conveyor 85 is to be directed comprises an air or hydraulic device 96 having a cylinder 97 pivotally connected at one end to a bracket 98 mounted on a cross bar 99 secured to the supports 89 and 95. The device 96 also includes a piston (not shown) mounted for reciprocating movement within the cylinder 97 and being connected to one end of a piston rod 100, the other end of which is pivoted to a bracket 101 mounted at the bottom of the extension 87. The arrangement is such that movement of the piston rod 100 in a direction out of the cylinder 97 will cause the extension 87 to move to the chain line position shown in FIGURE 1 and deliver articles to the conveyor 92, whereas movement of the piston rod 100 in the opposite direction will return the extension 87 to the full line position shown in FIGURE 1 to deliver articles to the conveyor 93. The mechanism for actuating the device 96 will be described later.

Loading Transfer Mechanism

Mechanism for transferring articles from the delivery conveyors 92 and 93 is designated generally by the reference character 102 and is disclosed in FIGURES 4-7. The mechanism comprises a pair of supporting brackets 103 spaced apart a distance corresponding substantially to the width of the shelves on the rack 22 and loosely mounted at corresponding ends on a shaft 104 journalled in brackets 105 mounted on selected frame members 5 of the housing structure 1 at a level corresponding substantially to the level of the lower delivery conveyor 93. Adjacent to each end of the shaft 104 is keyed a gear 106 in mesh with an idler gear 107 mounted on the housing structure 1 and extending through the opening 11 in the cabinet. The idler gear 107 meshes with a gear 108 mounted on a shaft 109 fixed to the power roll 86 of the delivery conveyor 93 and transmits rotation of the gear 108 to the gear 106. Also fixed to the shaft 104 is a pair of spaced sprocket wheels 114 around which is trained a chain conveyor 116 having an upper run 117 forming substantially a continuation of the upper run of the delivery conveyor 93 and supported by a guide member 117' (see FIGURE 6). In order to reduce as much as possible the gap between the conveyors 93 and 116, the latter conveyor also may be trained around an idler wheel 118 mounted on a shaft 119 supported by the housing structure 1 quite close to the conveyor 93.

The opposite end of the transfer conveyor 116 is trained around a pair of smooth nose pieces 120 which are interconnected at their forward ends by a bar 121 and which are interconnected at their rearward ends by a rod 122 which has its ends received in slots 128 formed in the bracket members 103 so as to permit back and forth movement of the rod 122 relative to the brackets 103. The ends of the rod 122 extend into openings formed in a pair of slide members 124 having their forward ends notched as at 125 and forming part of the positioning device 41. The slides 124 are mounted for reciprocating-movements between upper and lower guide elements 126 mounted on the brackets 103.

The lower run 123 of the conveyor 116 is trained around an idler wheel 130 (see FIGURE 5) which is mounted to rotate about a stub shaft 131 mounted on the bracket 106. Thence the conveyor run 123 passes over another idler wheel 132 that is journaled on a shaft 133 carried at the end of a post 134 which is mounted for vertical movements in a guide formed by a flange 135 struck out from the bracket 103. The bracket 103 may include another guide 136 receiving the shank of the post 134, and mounted on the post 134 between the guide 136 and an adjusting device 138 is a compression spring 139 which normally exerts a force on the post 134 tending to move it upwardly so as to take up any slack in the conveyor 116.

The construction and arrangement of the parts of the transfer mechanism thus far described are such that the conveyor 116 is continuously driven as long as the conveyor 93 is operating, and the nose pieces 120 may be moved back and forth by means yet to be described so as selectively to increase and decrease the length of the upper run 117 of the conveyor 116. During the increase or decrease in length of the upper run of the conveyor, the post 134 will be adjusted automatically with or against the bias of the spring 139 so as to maintain proper tension on the conveyor 116.

Means is associated with each of the bracket members 103 for effecting reciprocating movement of the slides 124 and, consequently, the nose piece 120, and comprises a link 140 (see FIGURES 5 and 7) pivotally connected at one of its ends to a post 141 fixed to the slide 124 and pivoted at its other end by means of a pin 142 to one arm 143 of a bell crank which, in turn, is pivoted at its center on a post 144 mounted on the housing structure. The other arm, 145, of the bell crank may be pivoted by means of a pin 146 to one end of a piston rod 147 which extends into a cylinder 148 of a hydraulic or pneumatic ram and is connected at its other end to a piston (not shown) mounted for reciprocating movements under the influence of a solenoid actuator within the cylinder 148. The cylinder may be pivotally connected by means of a post 149 to a mounting ear 150 supported on an extension 151 forming part of the bracket member 103. Actuation of the pistons and piston rods 147 in one direction will cause the positioning device 41 and the slides 124 and the nose pieces 120 to move in a direction towards a rack 22, thereby increasing the effective length of the upper run 117 of the conveyor 116, whereas movement of the piston rods 147 in the opposite direction will move the slides 124 in a direction to decrease the effective length of the upper run 117 of the conveyor. Movement of the slides 124 towards a rack 22 causes the notches 125 to receive the adjacent flange portion 42 of the rack. Because the walls of the notches are inclined towards one another, the rack 22 may be forced to move somewhat so as to position the upper run of the associated material supporting conveyor 33 at a level corresponding to the level of the upper run of the transfer conveyor 116.

Referring now particularly to FIGURES 6 and 7, one slide member 124 carries a stub shaft 153 on which is journaled a rotatable sleeve 155 to which is keyed or otherwise suitably secured a gear 157 having teeth adapted to mesh with the teeth on the toothed wheel 31 carried on a rack frame bar 29. Also keyed to the sleeve 155 is a sprocket wheel 159 around which is trained a sprocket chain 160. Connected to the post 153, but being free of the sleeve 155, is one end of an arm 161, the other end of the latter being pivoted on a post or shaft 162 which is mounted on an arm 163 fixed by suitable means to the housing structure 1. Rotatably mounted on the post 162 is a sprocket wheel 165 around which the chain 160 also is trained. A pulley 167 also is rotatably mounted on the post 162 and receives a driving belt 168 which is trained around a pulley 169 fixed on the armature shaft 170 of an electric motor M–2 that is mounted on a support 171 fixed to the housing structure 1. The arrangement is such that operation of the motor M–2 causes rotation of the pulley 167 and rotation of the sprocket wheel 165 and, consequently, rotation of the sprocket wheel 159 and the gear 157.

Because of the pivotal connection of the arm 161 to the post 162, the assembly of the shaft 153 and the parts mounted thereon is shiftable towards and away from the adjacent rack 22 so as successively to engage the gear 157 with each of the toothed wheels 31 carried by a given rack 22. Means for rocking the arm 161 comprises a pneumatic or hydraulic device 172 composed of a cylinder 173 in which is reciprocably mounted a piston (not shown) to which is connected one end of a piston rod 174, the other end of which is pivotally connected to the arm 161 by means of a pin 175. The cylinder 173 may be pivotally connected to a mounting bracket 176 supported on the member 163.

In order to assure proper tensioning of the drive chain 160, the supporting member 163 may be equipped with a flange 177 through which extends an adjusting screw 178 that bears against a plate 179 secured to the bracket 103, which, as will be recalled, is pivotally mounted on the shaft 104.

Also forming part of the loading transfer mechanism and associated with the loading conveyor 92 is a pair of spaced apart brackets 180, each of which is rockably supported on a shaft 182 mounted in bearing supports 183 which are fixed to the housing structure 1. Many of the parts supported by the bracket plates 180 are the same as the parts previously described in connection with the plates 103. The similar parts are designated by the same reference characters previously used, but followed by the suffix a, and will not be described again in detail. The principal difference between the transfer mechanism associated with the upper loading conveyor 92 and the mechanism associated with the lower loading conveyor 93 is that the former does not include slides similar to the slides 124 nor a driving gear similar to the gear 157. The reason for the omission of these and their associated elements in the upper transfer mechanism is that the material supporting conveyor 33 at the upper end of each rack 22 is driven by the belt 44 from the second material supporting conveyor 33 and, hence, driving gears or the like associated with the upper transfer mechanism and the upper material supporting conveyor of each rack may be eliminated. The upper transfer mechanism does, however, include nose pieces 120a similar to the nose pieces 120 and which are reciprocable so as selectively to increase and decrease the effective length of the upper run of the conveyor 116a.

Means for reciprocating the nose pieces 120a comprises an air or hydraulic device 185 having a cylinder 186 pivoted at one end by means of a pin 187 to a lug 188 fixed at one side of a bracket plate 180 and containing a piston (not shown) to which is connected one end of a piston rod 189. The other end of the piston rod is pivoted as at 190 to a lever arm 191 which, in turn, is pivoted as at 192 to a bracket plate 180. Pivotally connected to the lever arm 191 by a pin 193 is one end of an adjustable length link 194, the other end of which is pivoted as at 195 to the nose piece 120a.

The transfer mechanisms associated with the conveyors 92 and 93 are adapted to operate in unison and for that purpose the rams 148 and 185 are synchronized for conjoint operation. Inasmuch as the spacing between material supporting conveyors on the racks 22 is constant, the spacing between the upper and lower transfer mechanisms also should be constant and should correspond to the spacing between conveyors on the racks 22. In order to assure proper spacing between the upper and lower transfer mechanisms, two of the bracket plates 103 and 180 are interconnected at corresponding ends by an adjustable length turnbuckle device 196.

Discharge Transfer Mechanism

Figure 4:
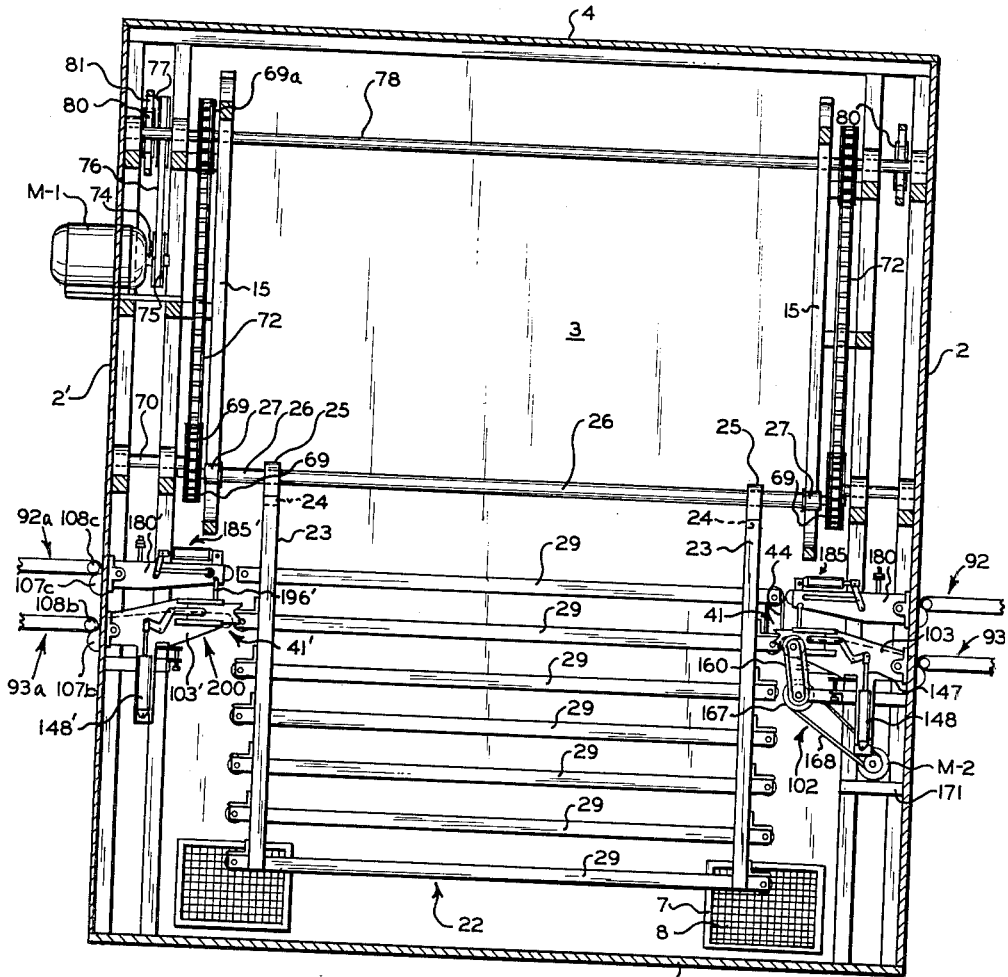
FIGURE 4 is a sectional view taken on the line 4—4 of FIGURE 3.

The discharge transfer mechanism is indicated in FIGURE 4 generally by the reference character 200 and is mounted directly opposite the loading transfer mechanism 102 on the housing structure 1. The only difference between the discharge transfer mechanism 200 and the loading transfer mechanism 102 is that no driving motor similar to the motor M-2 and its associated parts need be incorporated in the transfer mechanism 200 inasmuch as the rack conveyors 33 are driven by the loading transfer mechanism 102. Aside from this difference, the discharge transfer mechanism is the same as the mechanism 102 and corresponding reference characters followed by the prime symbol (') are used to designate similar parts. It is important to note, however, that the discharge transfer conveyors are fed from the rack conveyors 33, so the latter may be considered part of the transfer mechanism.

Discharge Mechanism

The discharge mechanism 91a is disclosed in FIGURES 2 and 4 and comprises a pair of superposed conveyors 92a and 93a driven by motors M-6 and M-7, the conveyors 92a and 93a being similar in all respects to the conveyors 92 and 93 previously disclosed and mounted at the opening 11'. The conveyors 92a and 93a include an arcuate portion 94a similar to the part 94 and the inner terminal ends of the conveyors are fitted with gears 108b and 108c which mesh with and drive the gears 107b and 107c of the discharge transfer mechanism 200. The construction and arrangement of the parts of the discharge transfer mechanism are such that when the feeding transfer mechanism 102 is actuated to transfer material from the delivery conveyors 93 and 94 to the material supporting conveyors of the rack 22, the discharge transfer mechanism 200 will be actuated so as to receive material from the material supporting conveyors of the racks 22 and transfer such material to the discharge conveyors 92a and 93a. The conveyors 92a and 93a discharge their goods via a boom 87a, similar to the boom 87, to a delivery conveyor 85a similar to the conveyor 85.

Figure 8:
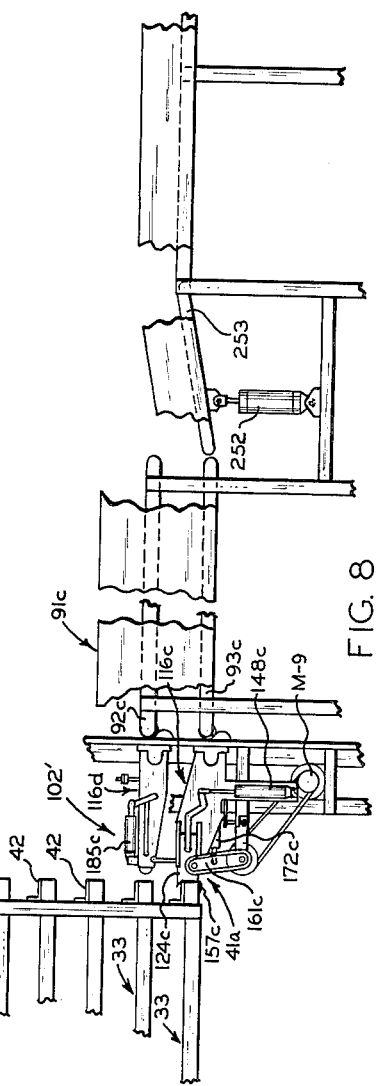
FIGURE 8 is a fragmentary elevational view of auxiliary unloading apparatus.

The delivery mechanism just described is, as has been pointed out, located at that end of the housing structure 1 which is directly across from the delivery mechanism 91. With this arrangement, goods delivered to the housing structure will be loaded on successive racks 22 and transported through a full cycle; that is, each rack will be transported completely around the closed loop before the goods thereon are discharged. Inasmuch as some types of baked goods, such as cookies and rolls, for example, need not be transported through a complete cycle in order to be cooled to the desired temperature, apparatus constructed in accordance with the invention may include an auxiliary discharge mechanism 91c located at the opening 11" in the housing structure and comprising a pair of superposed conveyors similar to the conveyor structures 92a and 93a. In order to effect discharge of material carried by the racks at the auxiliary discharge station, discharging transfer mechanism 102' (see FIGURE 8) identical to the loading transfer mechanism 102 may be located at the auxiliary station. Inasmuch as the auxiliary transfer mechanism is identical to the mechanism 102, the auxiliary mechanism need not be described in detail, but certain of its parts will be referred to specifically hereinafter.

Control System

Figure 9:
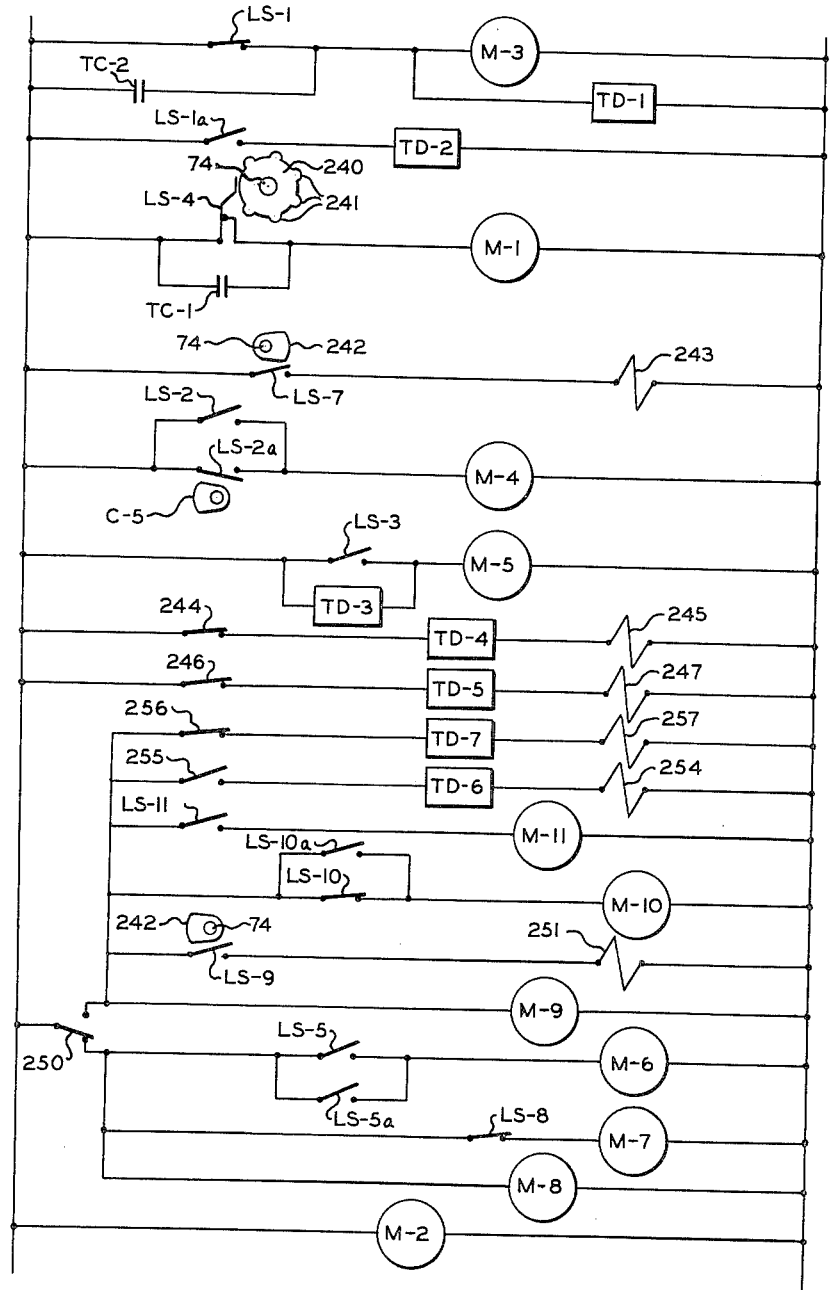
FIGURE 9 is a schematic diagram of control apparatus forming part of the invention.

The control system is schematically disclosed in FIGURE 9 and includes the motor M-3 drivingly connected to the conveyors 85 and 87 and having its terminals connected across a pair of power lines L-1 and L-2. The motor M-3 does not operate continuously, but operates in cycles to advance the conveyors 85 and 87 a measured distance. The interruption of the motor M-3 may be effected by the opening of a normally closed switch LS-1 located in the path of movement of a projecting part on the conveyor 85. The circuit of the motor M-3 also includes a timing relay TD-1 and a normally open contact TC-2 of a second timing relay TD-2 connected across the lines L-1 and L-2. The relay TD-2 is energized by a normally open switch LS-1a which is located beside the switch LS-1 and is actuated by the same operating part as the latter. The relay TD-2 operates to close a circuit to the motor M-3 through the contact TC-2 after the switch LS-1 has been opened for a short time.

The timing relay TD-1 includes a normally open contact TC-1 which is connected in the circuit of the main driving motor M-1 and about which more will be said subsequently. The motor M-1 normally is supplied with power through a normally closed switch LS-4 so as to enable the rack conveyor 45 to raise a carrier 22 to such position during the pause in operation of the motor M-3 that one of the material handling conveyors 33 of a rack 22 is in horizontal alignment with the feeding and discharging transfer conveyor mechanisms 102 and 200.

When a carrier 22 has been moved to the position shown in FIGURE 4, the normally closed switch LS-4 is opened by a cam 240 having a plurality of fingers or lobes 241, each of the latter being capable of opening the switch LS-4. The cam 240 may be mounted on the armature shaft 74 of the driving motor M-1 and it will be noted that, while each carrier includes seven conveyors 33, the cam 240 is equipped with only six fingers 241. The absence of one finger 241 enables each rack to be advanced by the conveyor 45 to an initial position at the loading zone such that its uppermost conveyor 33 passes the lower feeding conveyor 93 and is positioned adjacent to the upper feeding conveyor 92 at the time the operation of the motor M-1 is interrupted by the first opening of the switch LS-4.

The armature shaft 74 of the main driving motor M-1 also may carry another cam 242 so arranged as to close and hold closed a normally open switch LS-7 during the elevation of a carrier to a position in which its upper conveyor 33 is aligned with the upper feeding and discharge conveyors 92 and 92a. The closing of the switch LS-7 energizes a solenoid 243 which actuates the ram device 96 on the feeding side of the apparatus and the companion device on the discharge side of the apparatus to raise the respective booms or conveyor extensions 87 and 87a to the level of the upper conveyors 92 and 92a. As long as the boom 87 is in its lower position, it closes a switch LS-2 connected in the circuit of the motor M-4 which drives the lower delivery conveyor 93. When the boom is raised, it closes a switch LS-3 which is connected in the circuit of the motor M-5 which drives the upper delivery conveyor 92. The circuit to the motor M-4 also may include a normally open switch LS-2a adapted to be closed by a cam C-5 driven by the motor M-5 after predetermined operation of the latter so that both motors M-4 and M-5 will operate simultaneously after the boom 87 has been raised a predetermined length of time.

By the time the booms are elevated, the motors M-3 and M-4 will have operated a sufficient length of time to deliver a group of baked goods to the lower delivery conveyor 93, and during the time the booms are raised, a group of baked goods will be delivered to the upper delivery conveyor 92. The upper delivery conveyor 92 is, as has been stated, driven by the motor M-5 and operates to receive goods from the boom 87 and advance them towards the opening 11 in the housing. By the time the goods on the conveyor 92 are in the same relative position as the goods on the lower conveyor 93, the switch LS–2a is closed so that the conveyors 92 and 93 operate in unison. At this point, the switch LS–7 is released by the cam 242 and the booms 87, 87a are lowered. The lowering of the booms opens the switch LS–3 to the motor M–5, but the latter continues to operate for a time due to the operation of a timing device TD–3 which bridges the switch LS–3.

It will be recalled that the conveyors 92 and 93 operate the upper and lower feeding transfer devices at the loading zone. As long as the conveyors 92 and 93 operate, therefore, the feeding transfer devices will be enabled to receive goods from the conveyors 92 and 93 and conduct them towards the rack at the loading zone. The conveyors of the racks adjacent to the conveyors 92 and 93, however, are not driven until the positioning device 41 has been actuated and the ram device 172 has been operated to engage the driving gear 157 with one of the gears 31 of the adjacent conveyor 33.

The positioning device 41 of the lower transfer conveyor 116 may be actuated by a normally closed switch 244 located in a position to be closed by the projecting flanges 42 on the racks 22 and connected through a timing device TD–4 to a solenoid 245 which is arranged to effect extension of the piston rods 147 and 189 of the lower and upper transfer mechanisms so that the upper run of each of the transfer conveyors will span the distance between the delivery conveyors 92 and 93 and the carrier conveyors 33. When the positioning device 41 is actuated, the slide member 124 moves forwardly and may engage and open a normally closed switch 246 connected through a timing device TD–5 to a solenoid 247 arranged to actuate the ram 172 to effect engagement between the driving pinion 157 and the rack carried gear 31. Engagement of the gears 157 and 31 will cause the two upper conveyors 33 of the rack 22 to be driven so that they may receive goods from the transfer conveyors 92 and 93. The timing devices TD–4 and TD–5 are effective to maintain the positioning device and the transfer mechanisms in their operative positions a length of time sufficient to permit goods on the delivery conveyors 92 and 93 to be transferred to the conveyors 33.

Apparatus for controlling the discharge mechanism 200 is generally similar to the apparatus described in connection with the delivery mechanism in that separate motors M–6 and M–7 are provided for driving the upper and lower discharge conveyors 92a and 93a, respectively, when desired. The discharge mechanism includes a manually operable selecting switch 250 which, when it is in the position shown in FIGURE 9, forms part of a circuit to the motors M–6 and M–8. The circuit of the motor M–6 includes a switch LS–5 which is closed by the boom 87a when it is in its raised position so as to enable goods discharged from a rack conveyor 33 to the upper discharge conveyor 92a to be conducted to the conveyor 85b. The motor M–7 drives the lower discharge conveyor 93a continuously except during the time the boom 87a is in its raised position, and the operation of the motor M–7 is governed by a switch LS–8 which is closed by the boom 87a when the latter is in its lowered position. The conveyors 92a and 93a operate concurrently during the concurrent operation of the loading conveyors 92 and 93, so the circuit of the motor M–6 includes a switch LS–5a which is closed by the boom when it is in its lowered position to supply energy to the motor M–6. The conveyor 85a, including the conveyor of the boom 87a, is driven continuously by the motor M–8.

*Auxiliary Unloading Mechanism*

The auxiliary unloading mechanism 102′ is so located that, when carriers to be loaded are in their loading positions, previously loaded carriers will be located at the auxiliary unloading zone. Hence, the switch LS–4 also controls the positioning of the carriers at the auxiliary unloading zone. When the selecting switch 250 is in the position shown in FIGURE 8, the auxiliary unloading mechanism is disabled from operation. Should it be desidable to unload goods from the carrier at the auxiliary zone, however, the switch 250 may be moved to make contact with a circuit leading to a motor M–9 which corresponds to the motor M–2 of the loading mechanism 102.

The circuit of the auxiliary mechanism includes a switch LS–9 located in a position to be closed by the cam 242, previously referred to, and which, when closed, actuates a solenoid 251 which operates to actuate a device 252 similar to the device 96 to raise a boom 253 similar in all respects to the booms 87 and 87a. The location of the switch LS–9 should be such, however, that actuation of the auxiliary discharge boom does not take place until the lowermost conveyor 33 of a rack is being loaded at the loading zone. The purpose of this arrangement will be explained shortly.

As long as the auxiliary unloading boom 253 is in its lowered position, it closes a switch LS–10 connected in a circuit leading to a motor M–10 which drives the lower discharge conveyor 93c of the auxiliary discharge conveyors 91c. The lower conveyor 93c is connected by gearing, similar to the gearing previously described, to the lower transfer conveyor 116c of the apparatus 102′ so as to drive the conveyor 116c in a direction to receive goods from the adjacent carrier rack 33 as long as the motor M–10 operates. The upper transfer conveyor 116d is similarly geared to the upper conveyor 92c so as to be driven as long as the latter operates. When the boom 253 is in its raised position, it opens the switch LS–10 and closes a switch LS–11 which is connected in a circuit leading to a motor M–11 that operates to drive the upper conveyor 92c of the apparatus 91c. The conveyors 92a and 93c must operate concurrently during the time the two upper rack conveyors 33 are opposite the discharge transfer devices 116c and 116d, so a switch LS–10a, connected to the motor M–10, is located in a position to be closed by the boom 253 when it is in its raised position.

The auxiliary unloading mechanism 102′ includes positioning means 41a similar in construction and operation to the mechanism 41. The positioning mechanism 41a includes rams 148c and 185c like the rams 148 and 185 and which are operated by a solenoid 254 actuated by the closing of a normally open switch 255 located in a position to be engaged by the flanges 42 on the carriers. The circuit to the switch includes a timing device TD–6 which is adapted to open the circuit to the solenoid 253 after a predetermined time interval of such length as to enable the transfer of goods from the carriers to the transfer devices 116c and 116d to be effected.

The auxiliary unloading mechanism also includes an arm 161c similar to the arm 161 and which carries a gear 157c like the gear 157 operable to drive the rack conveyors 33 from the motor M–9. The arm 161c is operated by a ram device 172c, similar to the ram 172, in response to movement of the slide member 124c of the positioning device 41c to open a normally closed switch 256 connected through a timing device TD–7 to a solenoid 257, the operation of the solenoid causing the arm 161c to be oscillated in the same manner as the arm 160 and at the same time as the latter.

It will be recalled that loading of the carriers at the loading zone proceeds from the uppermost conveyors 33 to the lowest. Unloading of the carriers at the auxiliary unloading zone, however, must proceed from the lowermost conveyor 33 to the top. Since the two upper conveyors 33 must be unloaded simultaneously in order not to interfere with the orderly succession of carriers through a cycle, the switch LS–9 is so related to the cam 242 that it is not closed until the upper two conveyors 33 of each rack are opposite the upper and lower transfer devices 92c and 93c of the auxiliary discharge mechanism. Hence, raising of the boom 253 does not take place until the upper two conveyors 33 of a rack are in a position to be unloaded.

General Operation

In describing the general operation of the apparatus, it will be assumed that each of the racks 22 is fully loaded with bakery products and that the machine is so adjusted that the products on each of the racks are carried through a complete cycle through the apparatus, i.e., the baked goods are loaded and unloaded at the same end of the housing structure. It also will be assumed that additional baked goods emerging from an oven or the like are contained on the conveyor 85. In these conditions of the parts, the main driving motor M–1 will operate the conveyor apparatus 45 to cause a rack such as 22b to approach the loading zone. The rack 22b will be transferred from the lower run 14 of the closed conveyor loop to the vertical run 15 and will be lifted vertically until the first lobe 241 on the cam 240 opens the switch LS–4. At this time the uppermost conveyor 33 of the rack 22b will be in horizontal alignment with the upper loading conveyor 92 and the upper unloading conveyor 92a, and the second highest conveyor 33 will be in substantial alignment with the lower loading conveyor 93 and the lower unloading conveyor 93a, as is shown in FIGURE 4. Movement of the rack 22b will be interrupted when the rack reaches the described position inasmuch as the switch LS–4 then will be open.

During the time the rack 22 is moving to the described position, a group of baked goods on the conveyor 85 will be transferred via the boom 87 to the upper loading conveyor 92 and another group of baked goods will be transferred via the boom 87 to the lower loading conveyor 93. When there are groups of baked goods on both of the upper and lower loading conveyors, the motors M–4 and M–5 will drive these conveyors to advance the baked goods to the lower and upper transfer conveyors 116 and 116', which, it will be recalled, are driven from the respective loading conveyors 93 and 92.

During the course of the transfer of the baked goods from the loading conveyors to the transfer mechanisms, the positioning device 41 of both the loading and discharging devices will have been actuated to align the two upper rack conveyors 33 with the upper and lower loading transfer conveyors and the upper and lower discharge transfer conveyors. The drive pinion 157 also will have been moved into engagement with the gear 31 forming part of the second highest rack conveyor 33 so as to cause that conveyor 33 to be driven. Driving of the second highest conveyor 33 will cause the uppermost conveyor 33 also to be driven because of the drive transmitting belt 44.

The driving of the upper and second rack conveyors 33 enables baked goods on the loading transfer conveyors 116 and 116' to be transferred to the adjacent rack conveyors 33 and it will be apparent that driving of the conveyors 33 will cause baked goods thereon which have been conducted through a cooling cycle to be discharged to the discharge transfer mechanisms. The conveyors 33 of each rack, therefore, not only constitute means for supporting goods through a cycle of the apparatus, but also constitute a part of the discharge apparatus.

Goods discharged from the two upper rack conveyors 33 to the discharge transfer mechanisms are transferred by the latter to the discharge conveyors 92a and 93a which deliver the goods via the boom 87a to the continuously operating conveyor 85a for transfer to another station.

When the upper two rack conveyors 33 have been unloaded and reloaded, the positioning devices 41 release the rack 22b and the contact TC–2 of the timer TD–2 closes to supply energy to the motor M–1, whereupon the latter drives the conveyor mechanism 45 to effect vertical movement of the rack 22b from the position shown in FIGURE 4 to a position in which the third rack conveyor 33 is in a location to be engaged by the positioning devices 41. This position of the rack 22b is determined by the engagement of a second cam lobe 241 with the switch LS–4 which closes automatically upon restarting of the motor M–1. When the third rack conveyor 33 is aligned with the lower delivery and discharge conveyors 93 and 93a the goods on the conveyor 93 will be transferred via the loading transfer mechanism 116 to the rack conveyor 33 and goods on the latter will be transferred to the discharge conveyor 93a via the discharge transfer mechanism. Inasmuch as the cam 242 operates once only for each rack 22, the booms 87 and 87a will not be actuated during the loading and unloading of the third and successive conveyors 33 of each rack, so no goods will be transported over the upper loading and unloading conveyors 92 and 92a.

When the third rack conveyor 33 has been unloaded and reloaded, the rack 22b is indexed upwardly incrementally to effect loading and unloading of each of the remaining conveyor racks, whereupon the next rack in line is loaded and unloaded in the same manner as that described in connection with the rack 22b.

As each rack leaves the loading and unloading zone, it is delivered to the upper run 18 of the closed loop where it bears against the end rack and pushes the entire row of racks on the upper run towards the opposite vertical run so that the end rack adjacent to that vertical run is engaged by the conveyor chains and lowered to the lower run. If the products passing through the cooler are of such character that they need not be subjected to a complete cycle of cooling, the discharge mechanism opposite the loading mechanism may be disabled by throwing the switch 250 and the discharge mechanism adjacent the auxiliary unloading zone 11" may be actuated to effect successive unloading of each of the conveyors 33 of a rack in the manner previously referred to.

The invention has been described with particular reference to its use as a cooler. It should be understood, however, that the invention is capable, with slight changes, of other uses such as a dough proofer, for example. When used as a proofer, it would be necessary only to block the openings 7 and replace the fans with suitable air conditioners and air circulating devices of known construction.

The disclosed embodiment of the invention is representative of a presently preferred form of the invention but is intended to be illustrative rather than definitive thereof. The invention is defined in the claims.

What is claimed is:

1. Material handling apparatus comprising means forming a loop; a plurality of carriers movably mounted on said loop-forming means for movement around said loop from a material loading zone to a material unloading zone, each of said carriers having a plurality of material supporting members which are adapted to support material independently of the others; said loop forming means including means for moving said carriers around said loop and past each of said zones in such manner that each of said supporting members of each carrier passes in succession adjacent to each of said zones; means mounted at said loading zone for loading material on each of said supporting members in timed relation to its arrival at said loading zone; means forming part of each of said supporting members for discharging material therefrom in timed relation to its arrival at said unloading zone; and extending means movable into and out of the path of travel of said carriers and into and out of driving engagement with said discharging means for operating said discharging means when each of said supporting members arrives at said unloading zone.

2. The apparatus set forth in claim 1 wherein said loading zone and said unloading zone are located at the same part of said loop but on opposite sides of the latter.

3. The apparatus set forth in claim 2 including means for delivering material to said loading zone and means for receiving material discharged at said unloading zone.

4. The apparatus set forth in claim 3 wherein said delivering means includes a first conveying device for delivering material to said loading zone at one level; a second conveying device for delivering material to said loading zone at another level; and means for directing material to each of said conveying devices.

5. The apparatus set forth in claim 4 wherein said directing means comprises a boom member mounted for shifting movement to and from the levels of said first and second conveying devices; and means for shifting said member to and from said levels.

6. The apparatus set forth in claim 4 wherein said plurality of material supporting members of a carrier are spaced from one another a distance corresponding to the spacing between said first and second conveying devices.

7. The apparatus set forth in claim 6 wherein each of said material supporting members comprises an endless conveyor.

8. The apparatus set forth in claim 7 wherein at least one of said conveying devices includes positioning means engageable with each of said carriers at said loading and unloading zones for aligning successively the endless conveyors with said conveying devices.

9. In material handling apparatus having a plurality of material carriers arranged to move about a closed loop from a loading zone to an unloading zone, and return, each of said carriers having a plurality of vertically spaced material supporting members: the combination of means for moving each of said carriers incrementally past each of said zones; a pair of vertically spaced delivery devices at said loading zone and spaced apart a distance corresponding to the spacing between successive supporting members; means for locating each of said carriers in one position at said loading zone such that two of said material supporting members are aligned with said pair of devices; means for transferring material from both of said devices when each of said carriers is in said one position; means operable to render one of said devices inactive in all other positions of each of said carriers at said loading zone while the other device is enabled to deliver material successively to each of the remaining material supporting members of each of said carriers; a pair of vertically spaced discharge devices at said unloading zone spaced apart a distance corresponding to the spacing between successive supporting members; means for locating each of said carriers in such position at said unloading zone that two of said material supporting members are aligned with said pair of discharge devices; means for transferring material from said two material supporting members to said pair of discharge devices when each of said carriers is in such position; means operable to render one of said discharge devices inactive in all other positions of each of said carriers at said unloading zone while the other discharge device is enabled to receive material discharged from successive material supporting members of each of said carriers; and means for operating said transferring means.

10. The apparatus set forth in claim 9 wherein said loading and unloading zones are at the same part of said loop but on opposite sides of the latter.

11. The apparatus set forth in claim 9 wherein each of said material supporting members of a carrier comprises an endless conveyor; and means for driving each of said conveyors in timed relation to the operation of said transferring means.

12. In material handling apparatus having a plurality of material carriers arranged to move from a loading zone to an unloading zone, said carriers having a plurality of vertically spaced material supporting members: the combination of means for moving said carriers incrementally vertically past said zones; a pair of vertically spaced delivery devices at said loading zone and spaced apart a distance corresponding to the spacing between supporting members on said carriers; means for locating each of said carriers in one position at said loading zone such that two of said material supporting members are aligned with said pair of devices; means for transferring material from both of said devices when each of said carriers is in said one position; and means operative to disable one of said devices in other positions of each of said carriers at said loading zone while the other device is delivering material successively to other material supporting members of said carriers.

13. Material handling apparatus having at least one material carrier arranged to move in a closed path from and to a loading zone located at one part of said path; means at said loading zone for loading material on said carrier when the latter is at said loading zone; means for unloading material from said carrier; means located at said one part of said path operable to receive material unloaded from said carrier; means located at another part of said path for receiving material unloaded from said carrier; and control means selectively operable to operate said unloading means when said carrier is located at either of said parts of said path.

14. Material handling apparatus including a housing structure; spaced apart upper and lower, generally longitudinally extending, support rails; an endless conveyor member having generally vertically disposed runs substantially connecting the ends of said rails; said conveyor member also having runs extending from said generally vertically disposed runs along said rails for a short distance, portions connecting therewith leading generally vertically from said rails, and runs extending generally longitudinally with said rails at levels removed therefrom; carriers with vertically spaced racks having means for engagement with said rails for supporting the carriers therefrom; lug means spaced on said endless member for engagement and disengagement with said carriers successively to move the carriers vertically from one rail to the other in a circuitous travel; and means for supplying products to and discharging them from said racks.

15. Material handling apparatus including a housing structure; spaced apart upper and lower, generally longitudinally extending, support rails; an endless conveyor member having generally vertically disposed runs substantially connecting the ends of said rails; said conveyor member also having runs extending from said vertically disposed runs along said rails for a short distance, portions connecting therewith leading vertically from said rails, and runs extending generally longitudinally with said rails at levels removed therefrom; carriers with vertically spaced material support endless conveyors having means for engagement with said rails for supporting the carriers therefrom; lug means spaced on said endless member for engagement and disengagement with said carriers successively to move the carriers vertically from one rail to the other in a circuitous travel; means for supplying products to and discharging them from said conveyors when the carriers are on said vertical runs; drive means on said carriers connected with each of said endless conveyors; and coupling means carried by said means for supplying products to and discharging them from said conveyors movable to and from engaging position with said drive means in timed relation with the travel of said carriers.

16. The combination defined in claim 15 in which said drive means and coupling means comprise intermeshing pinions, a conveyor, with at least a portion movable toward and away from said carrier, mounts one pinion; and means for moving said latter conveyor to bridge the space between itself and a carrier conveyor.

17. Material handling apparatus including a housing structure; a plurality of material handling carriers having vertically spaced endless conveyor shelves; means forming a conveyor loop having generally vertically extending runs connected with generally longitudinally extending runs and moving said carriers circuitously around said loop in incremental movements; a material handling conveyor member extending generally normally to said loop and the longitudinally extending runs adjacent one of the vertically extending runs; a drive member carried by said conveyor member for movement toward and away from a carrier on a vertical run; a driven member for the shelves drivingly engaged by said drive member in one position thereof; and means for moving said drive member in timed relation with the incremental movement of said carriers.

18. The combination defined in claim 17 in which positioning slide means is reciprocably carried by said conveyor member; said slide and each carrier have positioning means for correctly aligning a carrier with said conveyor member; and means for operating said slide in timed relation with the travel of said carriers.

19. Material handling apparatus including a housing structure; a plurality of material handling carriers having vertically spaced endless conveyor shelves; means forming a conveyor loop having generally vertically extending runs connected by generally longitudinally extending runs and moving said carriers circuitously around said loop in indexing movements; a pair of conveyor members extending generally normally to said loop adjacent one of the vertically extending runs; a drive member mounted for movement toward and away from a carrier on a vertical run; a driven member for the shelves drivingly engaged by said drive member in one position thereof; means on one conveyor shelf when the latter is opposite one of said conveyor members for driving the conveyor shelf opposite the other conveyor member; and means for moving said drive member in timed relation with the indexing movement of said carriers.

20. The combination defined in claim 19 in which a boom conveyor is movable to positions to selectively load said pair of conveyor members; and means controlling the operation of said boom conveyor in synchronism with the travel of said carriers.

21. Material handling apparatus including a housing structure; a plurality of material handling carriers having vertically spaced endless conveyor shelves; means forming a conveyor loop having generally vertically extending runs connected by generally longitudinally extending runs and moving said carriers circuitously around said loop in indexing movements; a conveyor member extending generally normally to said loop adjacent one of the vertically extending runs; a bridging section carried by said conveyor member for movement toward and away from a carrier on a vertical run; means for driving the shelves; and means for moving said bridging section in timed relation with the indexing movement of said carriers.

22. Material handling apparatus including a housing structure; spaced apart upper and lower generally longitudinally extending support rails; an endless conveyor having generally vertically disposed flights near the ends of said rails extending from near one rail toward the other rail and from near the said other rail toward said one rail, said conveyor also having portions leading generally longitudinally from said generally vertically disposed flights for a short distance and portions connecting therewith leading generally vertically therefrom, said conveyor having flights connected with said generally vertically leading portions and extending generally longitudinally at levels vertically spaced from said generally longitudinally leading portions of said conveyor; carriers with generally vertically spaced racks having means for engagement with said rails for supporting the carriers therefrom; means spaced in predetermined relation on said endless conveyor for engagement and disengagement with said carriers successively for supporting said carriers in their vertical travel on said generally vertically disposed flights to move the carriers from one rail to the other; and means for supplying products to and discharging them from said racks.

23. Material handling apparatus including a housing structure; a plurality of material handling carriers having vertically spaced, material supporting shelves; means forming a conveyor circuit and moving said carriers circuitously in incremental movements from a material loading zone to a material unloading zone; means for loading material to and unloading material from said shelves; extensible positioning means mounted adjacent one of said zones movable toward and away from the path of travel of said carriers and into and out of positioning engagement with said carriers for correctly positioning said shelves at said one of said zones; and means for operating said positioning means in timed relation with said incremental movements of the carriers.

24. Material handling apparatus including a housing structure; a plurality of material handling carriers having vertically spaced endless conveyor shelves; means forming a conveyor circuit and moving said carriers circuitously in incremental movements from a material loading zone to a material unloading zone; a material handling conveyor member extending generally normally to said means forming the conveyor circuit; a drive member mounted for movement toward and away from a carrier traveling adjacent one of said zones; a driven member for the shelves drivingly engaged by said drive member in one position thereof; and means for moving said drive member in timed relation with the incremental movement of said carriers.

25. Material handling apparatus including a housing structure; a plurality of material handling carriers having vertically spaced endless conveyor shelves; means forming a conveyor circuit and moving said carriers circuitously in incremental movements from a material loading zone to a material unloading zone; a pair of conveyor members extending generally normally to said means forming the conveyor circuit adjacent one of the zones; a drive member mounted at one of said zones for movement toward and away from a carrier traveling adjacent one of said zones; a driven member for the shelves drivingly engaged by said drive member in one position thereof; means on one conveyor shaft when the latter is opposite one of said conveyor members for driving the conveyor shelf opposite the other conveyor member; and means for moving said drive member in timed relation with the incremental movement of said carriers.

26. Material handling apparatus including a housing structure; a plurality of material handling carriers having vertically spaced endless conveyor shelves; means forming a conveyor circuit and moving said carriers circuitously in incremental movements from a material loading zone to a material unloading zone; a conveyor member extending generally normally to said means forming the conveyor circuit; a bridging section for bridging said conveyor member and shelves of said carriers mounted for movement toward and away from a carrier traveling adjacent one of said zones; means for driving the shelves; and means for moving said bridging section in timed relation with the indexing movement of said carriers.

27. Material handling apparatus comprising means forming a continuous conveyor circuit; a plurality of carriers supported on said means for movement around said circuit from a material loading zone to a material unloading zone, said carriers having a plurality of material supporting members which are adapted to support material independently; said means forming the conveyor circuit including means for moving said carriers past each of said zones in such manner that said supporting members of a carrier passes in succession adjacent to each of said zones; means mounted at said loading zone for supplying material to said supporting members in timed relation to their arrival at said loading zone; means forming part of said supporting members assisting the loading of material thereon to supported position in timed relation to their arrival at said loading zone; and extending means movable into and out of the path of travel of said carriers and into and out of driving engagement with said means forming part of said supporting members for operating said last means when said supporting members arrive at said loading zone.

References Cited in the file of this patent

UNITED STATES PATENTS

| | | |
|---|---|---|
| 1,165,035 | Streit | Dec. 21, 1915 |
| 1,837,605 | Baker | Dec. 22, 1931 |
| 2,536,756 | Lopez | Jan. 2, 1951 |
| 2,724,486 | Hatch et al. | Nov. 22, 1955 |
| 2,823,811 | Temple | Feb. 18, 1958 |
| 2,870,898 | Naylor et al. | Jan. 27, 1959 |
| 2,917,190 | Francis | Dec. 15, 1959 |